Jan. 26, 1926.  
A. H. POWELL  
1,570,860  
PLOWPOINT  
Filed August 17, 1921

ALDIN H. POWELL Inventor

By J. Crau Kelly Attorney

Patented Jan. 26, 1926.

1,570,860

UNITED STATES PATENT OFFICE.

ALDIN H. POWELL, OF HARMONY, PENNSYLVANIA.

PLOWPOINT.

Application filed August 17, 1921. Serial No. 493,047.

*To all whom it may concern:*

Be it known that I, ALDIN H. POWELL, citizen of the United States, residing at Harmony, in the county of Butler and State of Pennsylvania, have invented certain new and useful Improvements in Plowpoints, of which the following is a specification.

The invention relates to improvements in plow points and particularly to means for enlarging and extending the use of such points as earth working elements.

An object of the invention is to provide a plow point having auxiliary earth working means operating to split the furrow before being turned over, thereby making easier plowing and requiring less harrowing of the soil.

An additional object is to provide a plow point having auxiliary cutting means integral therewith and helping to pulverize the ground contemporaneously with the plowing thereof, and providing a better seed bed, all at the same operation.

A further object of the invention is to provide a device of the above character that is simple in construction, strong and durable and which it is believed may be manufactured at a reasonably low cost.

Various other objects and advantages of the invention will become apparent during the continuance of the following description.

In the drawings:—

Figure 1:
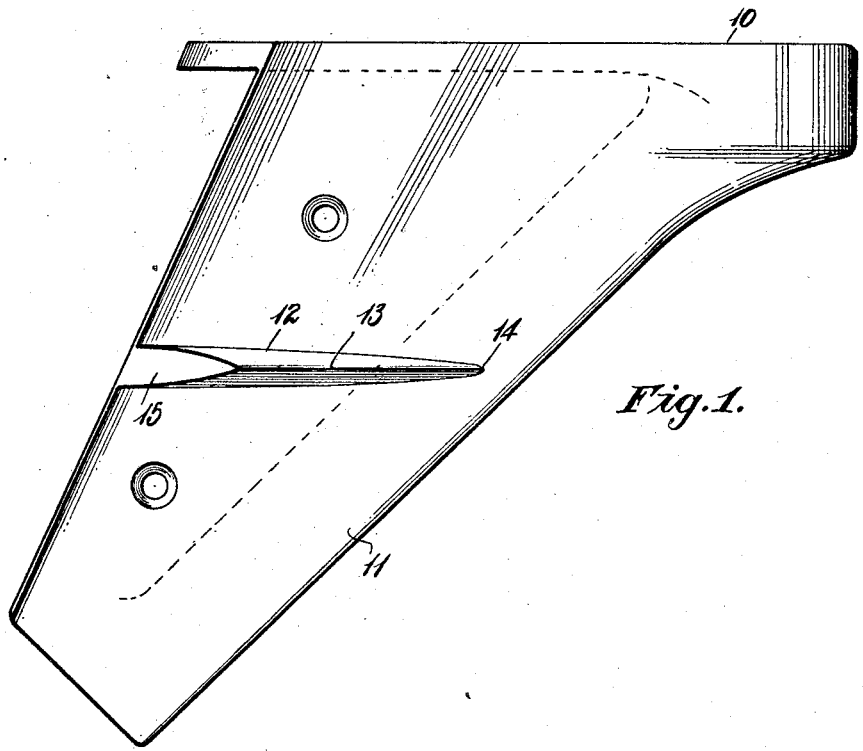
Figure 1 is a plan view of a plow point showing the application of the invention.
Figure 2:
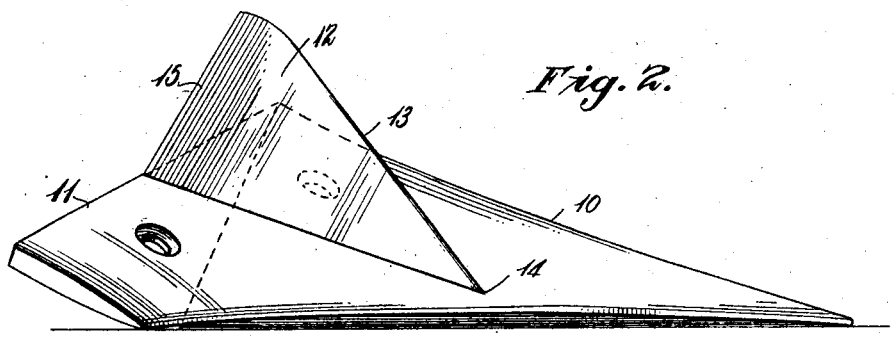
Figure 2 is a view in perspective showing the auxiliary cutting means of the plow point.

In the drawings, 10 designates a plow point of usual and ordinary design and to the wing 11 of the point is affixed an auxiliary cutting device or earth working element 12. This device may be either welded or formed integrally with the plow point and consists of a wedge shaped cutter, tapering longitudinally and transversely to provide a cutting edge 13 and a penetrating point 14. The cutter is arranged to project outwardly in a horizontal plane from the side face of the wing and at a suitable distance from the foot of the point. The height of the cutter upon the wing may vary to suit conditions, as it is preferable to have the cutter mounted higher for deep plowing than for shallow.

The butt end 15 of the auxiliary cutter may be flush with the rear edge of the wing 11 but the point 14 is located inwardly of the cutting edge of the wing so as to give the latter sufficient cutting surface.

The cutter is adapted to work on any kind of plow point that will turn over the soil and by its projection laterally of the plow point wing will serve to split the furrow before the latter is turned over, in addition to which it assists greatly in the pulverizing of the soil. The addition of such an auxiliary cutter to the plow point enables the soil to be quickly and conveniently conditioned for seeding and thereby eliminates the necessity for much harrowing.

From the foregoing it is believed that the advantages and novel features of my invention will be readily understood and therefore further detailed description is deemed unnecessary.

What is claimed is:—

As an article of manufacture, a plow share including a laterally projecting wing and an auxiliary cutter formed integral with an intermediate portion of the said wing so as to be centered between the opposite side edges of the latter and extending vertically above the upper face of the wing, said cutter presenting a sloping front edge extending upwardly and inwardly in a straight line from a point on the upper face of the wing and spaced inwardly from the leading edge of the latter to provide a straight cutting edge, said cutter also presenting a thickened rear edge sloping upwardly and inwardly in a straight line from a point on the upper surface of the said wing and flush with the trailing edge of the latter, the said sloping front and rear edges of the said cutter meeting and terminating at a point appreciably spaced above the said upper face of the said wing and located inwardly of the leading and trailing edges of the wing.

In testimony whereof I affix my signature.

ALDIN H. POWELL.